United States Patent [19]

Hassell

[11] 4,034,664
[45] July 12, 1977

[54] JUICE EXTRACTOR

[76] Inventor: John R. Hassell, 2403 Tepper Lane, Salem, Oreg. 97303

[21] Appl. No.: 695,581

[22] Filed: June 14, 1976

[51] Int. Cl.² .................. A23N 1/00; B02C 15/00; B04B 5/10; B26D 1/00
[52] U.S. Cl. .................................. 99/511; 99/631; 241/278 R
[58] Field of Search ............. 99/501, 503, 510–511, 99/513, 631–633, 512; 222/518; 210/113; 241/277, 278 R, 279–280

[56] References Cited

U.S. PATENT DOCUMENTS

| | | | |
|---|---|---|---|
| 2,513,519 | 7/1950 | Reynolds | 99/511 |
| 2,995,165 | 8/1961 | Menne | 99/511 |
| 3,480,213 | 11/1969 | Shelton | 241/278 R |
| 3,916,776 | 11/1976 | Arao | 99/503 |

*Primary Examiner*—Harvey C. Hornsby
*Assistant Examiner*—Robert Pous
*Attorney, Agent, or Firm*—Chernoff & Vilhauer

[57] ABSTRACT

A centrifuge-type apparatus for extracting, by pulverization and filtering under centrifugal force, the juice component from plant materials such as fruits or vegetables. Plant material introduced into the open top of a stationary hopper is pulverized upon contact with a series of fast-moving non-bladed, blunt protrusions extending upwardly from the surface of a rapidly rotating plate member extending across the open bottom of the hopper. The resultant juice and pulp mixture is then thrown outwardly under centrifugal force through an annular space of predetermined height formed between the bottom of the stationary hopper and the upper surface of the rotating plate. A frusto-conical filter member attached to and surrounding the rotating plate member impedes the outward motion of the pulp component of the pulverized plant material whle permitting the passage of the juice component. The juice component thus separated is collected within a stationary enclosure surrounding the rotating filter and plate, and conducted to the exterior of the apparatus for dispensation as desired. The wall of the filter is slanted outwardly toward its base to encourage the plug component of the plant material impinging thereon to migrate downwardly under centrifugal force, thereby providing a self-cleaning type action impeding the detrimental accumulation of excess pulp material over the fiter surface. Means are provided for selectively releasing the accumulated pulp material from within the rotating fiter without significantly interrupting the operation of the apparatus, and for collecting the released pulp in removable pans at the bottom of the apparatus enclosure.

11 Claims, 5 Drawing Figures

JUICE EXTRACTOR

BACKGROUND OF THE INVENTION

The apparatus of the present invention relate to a means for extracting juice from plant materials such as fruits and vegetables. Numerous devices have been developed in the past for centrifugally separting the juice component of a plant material from the pulp component. An example of such a device is that disclosed in Weston U.S. Pat. No. 2,295,922. Generally these known devices comprise a rotating disc or plate surrounded by a similarly rotating filter element. A plant material brought into contact with the disc is shredded into small particles by cutting elements forming a part of the disc and then thrown outwardly by centrifugal force to impinge upon the surrounding filter. The pulp component of the shredded material is captured by the filter while the juice component is permitted to pass through and be collected for subsequent conduction to the exterior of the device.

The rotating discs or other means utilized by known prior art devices to shred the plant material generally contain or embody cutting blades, wire mesh, or a series of apertures with upstanding margins. In any case, the function of the disc is to reduce the incoming plant material to small bits or particles that are then thrown against the rotating filter for separation into juice and pulp.

A significant disadvantage of known prior art devices is that, because of the cutting or grating action of their rotating discs, the plant material leaves the disc and impinges upon the rotating filter in the form of pulp containing a substantial proportion of material that has been merely cut or sliced into small chunks of the incoming whole, rather than being pulverized into a relatively uniform mixture of juice and well-beaten pulp. This less-than-complete pulverization of the incoming material produces a mixture having a significant amount of juice-containing particles that cannot be effectively treated by the rotating filter. The result is that a substantial proportion of the juice that could otherwise be extracted from the plant material is discarded with the pulp when the device is cleaned.

An additional disadvantage of the known prior art devices is that the pulp material impinging upon the interior surface of the rotating filter tends to accumulate after a period of time into a fairly thick mass that restricts the flow of juice through the filter. This pulp accumulation over the surface of the filter requires that the device be stopped often and the pulp material removed, either by removing a filter liner separating the pulp from the rotating filter element or by removing and cleaning the filter element itself. Also, because the pulp material tends to accumulate over the surface of the rotating filter in a nonuniform manner, the dynamic balance of the device may be adversely affected, causing the device to vibrate. Once such vibration begins, often without warning, the device must be immediately shut down and the accumulated pulp material removed or the device will be damaged.

A further disadvantage of known prior art devices, especially those devices utilizing a bladed member to convert the plant material into a pulp and juice mixture, is that their bladed or other cutting and slicing elements must be periodically sharpened, an operation generally requiring the device to be shut down for a significant period of time with an attendant decrease in production efficiency.

Finally, cleaning of pulp from known prior art devices after the extraction of juice from the pulp generally requires stopping the device and disassembly components thereof, which is time-consuming and impedes juice production.

Thus there remains a need for a juice extractor capable of completely pulverizing a plant material into its pulp and juice components so as to maximize the extraction of the juice from the pulp, as well as for a device that provides self-cleaning of the filter element, does not require sharpening, and may be emptied of accumulated pulp material without requiring a cessation or significant interruption of operation.

SUMMARY OF THE INVENTION

The present invention is directed to an apparatus for extracting juice from plant materials such as fruits and vegetables by substantially complete pulverization and subsequent filtering of the material under centrifugal force. More particularly, the apparatus of the present invention comprises an upright open-bottomed hopper member mounted over a rotating plate member having a plurality of upwardly extending, non-bladed, blunt protrusions for pulverizing solely by impact a plant material introduced into the hopper, and a similarly rotating annular filter element attached to and surrounding the plate member for separating under centrifugal force the juice component of the pulverized material from the pulp component, the plate member and filter element being housed in a suitable surrounding enclosure. The protrusions extending upwardly from the plate member are preferably blunt-ended cylinders or the like such as may be formed by the small ends of bolts or rivets extending upwardly through the material of the plate. The lower edge of the hopper is spaced a vertical distance above the uppermost surface of the plate member to permit the plant material pulverized by the rapidly circulating protrusions to be thrown outwardly under centrifugal force toward the surrounding filter element. This spacing between the hopper and the plate may be selectively varied to control the consistency of the pulverized material.

The filter element is preferably frusto-conical in shape, having a porous wall that slants outwardly toward its base. This slanting of the filter wall produces a self-cleaning action whereby the pulverized plant material impinging on the interior thereof is caused to migrate downwardly under centrifugal force toward an accumulation zone near the base of the filter. In this manner, the filter surface is maintained relatively clear of accumulated pulp material, permitting a more efficient separation of the juice from the pulp, and also permitting the apparatus to be operated for longer periods of time without cleaning. The juice separated from the pulp material is captured within the surrounding enclosure and conducted to the exterior of the apparatus for dispensation as desired.

A second rotating plate member extending across the base of the filter element to serve as the bottom of the space enclosed by the filter is selectively lowerable as desired while the device is rotated to permit the release under centrifugal force of the accumulated pulp material being forced downwardly by the slanted walls of the filter. This release of accumulated pulp material may be accomplished quickly and repeatedly as required without necessitating a prolonged halt in the operation of the apparatus. As the pulp material is released from the filter assembly defined by the filter element and the two plate members, it is permitted to accumulate in removable pans at the bottom of the surrounding enclosure. These pans may be removed and emptied as necessary also without requiring a halt in operations.

In operation, plant material is introduced into the hopper and permitted to fall onto the rapidly rotating plate member where it is pulverized solely by impact with the fast-moving blunt protrusions extending upwardly therefrom into a finely pulverized, substantially chunk-free uniform mixture. Once pulverized into such a mixture of its pulp and juice components the plant material is thrown outwardly under centrifugal force to impinge upon the surface of the surrounding filter element through which substantially only the juice component is permitted to pass. The separated juice component is then collected and conducted to the exterior of the extractor while the accumulating pulp component is periodically transferred from the filter assembly to the removable pans for disposal as required.

The use of the juice extracting apparatus of the present invention of blunt pulverizing elements, rather than bladed cutting or shredding elements, maximizes juice extraction and results in a relatively inexpensive and more efficient apparatus because of the ease of manufacture and installation of the pulverizing elements and because of the lack of any need to continually sharpen and periodically replace those elements as would be the case if the elements were of the cutting type.

It is, therefore, a principal objective of the present invention to provide an apparatus for completely pulverizing a plant material into a fine, relatively chunk-free mixture of its pulp and juice components, and thereafter separating the juice component therefrom.

It is an additional objective of the present invention to provide an apparatus of the type described for extracting juice from a plant material by substantially complete pulverization of the plant material into a mixture of its pulp and juice components solely by impact with a plurality of fast-moving, blunt, non-bladed elements, and subsequent separation under centrifugal force of the juice component of the material from the pulp component.

It is a further objective of the present invention to provide a centrifugal juice extractor of the type described utilizing a rotating annular filter element wherein a pulp material impinging upon the operative surface of the filter is forced to migrate under centrifugal force to an accumulation zone proximate one end of the filter, thereby keeping the operative surface of the filter relatively clear.

It is a still further objective of the present invention to provide a centrifugal juice extractor of the type described wherein the pulp component of a plant material remaining after the juice component has been extracted may be removed from the extractor as desired without necessitating a significant interruption in the operation of the extractor.

The foregoing objectives, features and advantages of the present invention will be more readily understood upon consideration of the following detailed description of the invention taken in conjunction with the accompanying drawings.

DETAILED DESCRIPTION OF THE PREFERRED EMBODIMENT

Figure 1:
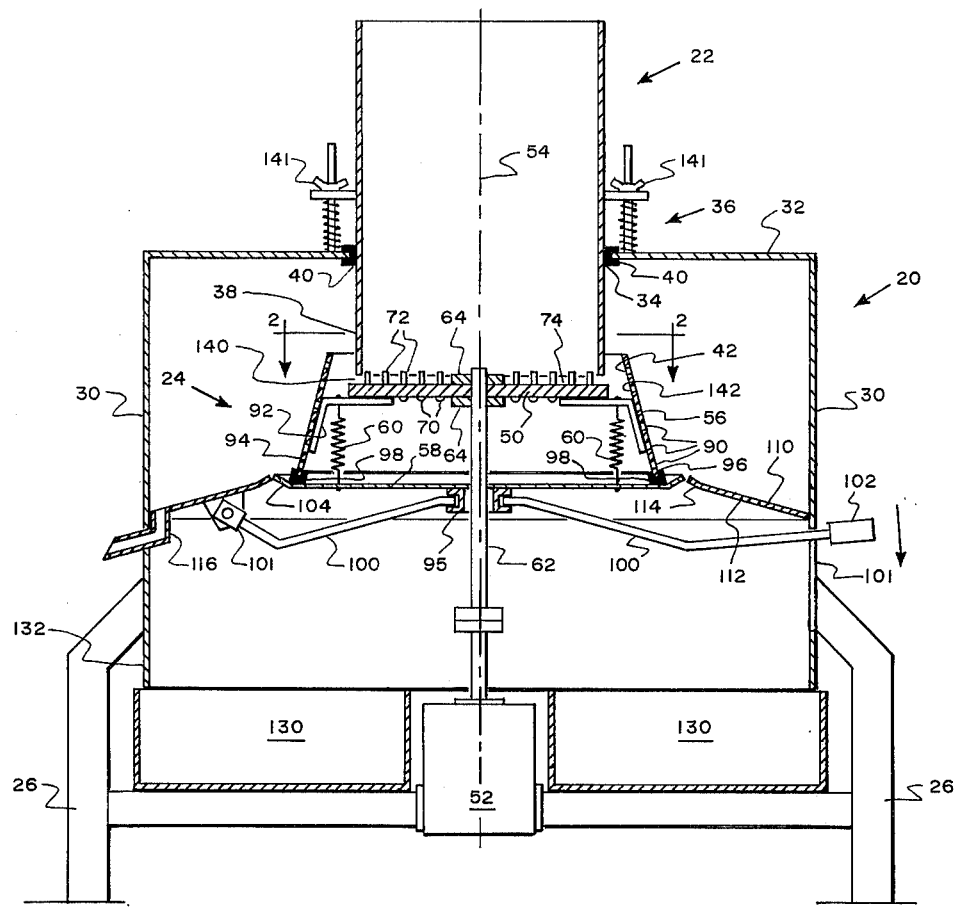
FIG. 1 is a sectional elevation of the preferred embodiment of the centrifugal juice extractor of the present invention.

Referring to the sectional elevation of FIG. 1, the centrigual juice extractor of the present invention comprises an enclosure 20 supporting an upright open-bottomed hopper member 22 and surrounding a motor-driven filter assembly 24. The enclosure 20, supported by a suitable framework such as 26, includes vertically oriented peripheral side members 30 and a top member 32 having an aperture 34 formed therein proximate its center. The hopper member 22 is supported in this aperture 34 by adjustable spring-biased support means 36 such that the lower portion 38 of the hopper extends through the aperture and into the interior of the enclosure 20. A suitable sealing means such as an annular gasket member 40 is provided for sealing the juncture between the aperture 34 and the hopper member 22.

Figure 2:
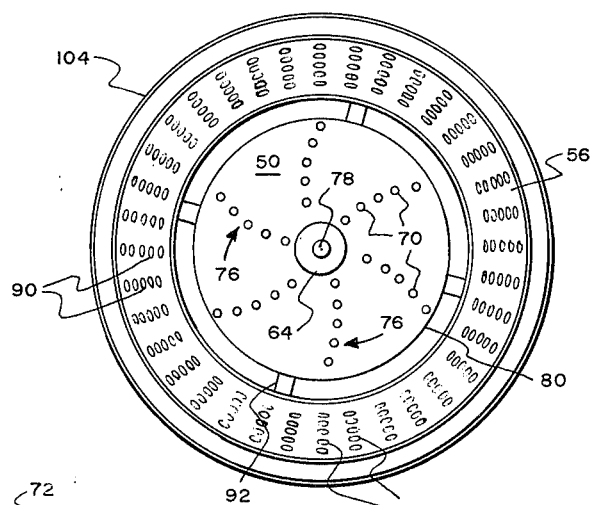
FIG. 2 is a plan view of the filter assembly including the pulverizing and filtering elements of the juice extractor of the present invention taken along line 2—2 of FIG. 1.

The filter assembly 24 positioned proximate the open bottom 42 of the hopper member 22, and shown in plan view in FIG. 2, comprises a horizontally oriented plate member 50 coupled to a drive motor 52 so as to be rotatable about an axis 54 extending vertically through the approximate center of the hopper member 22, an open-bottomed annular filter element 56 attached to and completely surrounding the plate member 50, and a horizontally oriented bottom member 58 extending across the open bottom of the filter element 56 to form the bottom of the assembly. The bottom member 58 is biased in an upward direction against the bottom of the filter member 56 by a plurality of springs 60 and the entire assembly 24 is rotatable as a unit about the single common axis 54 by attachment of the plate member 50 a shaft 62 coupled to the drive motor 52.

Figure 1B:
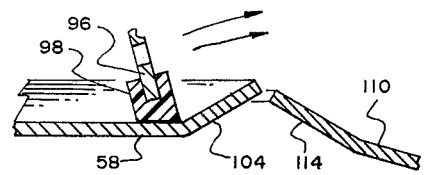
FIG. 1b is a detailed sectional view of a portion of the filter assembly with the bottom of the assembly in its elevated position.
Figure 1C:
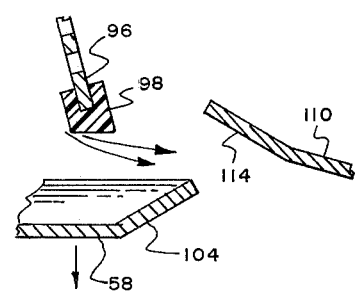
FIG. 1c is a detailed sectional view of a lower portion of the filter element from which the bottom of the filter assembly has been lowered to permit the removal of pulp.
Figure 1A:
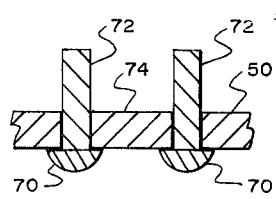
FIG. 1a is a detailed sectional view of a exemplary pulverizing elements of the juice extractor of the present invention.

The plate member 50 includes a plurality of upright rivets 70, pins, bolts or similar members having rounded or otherwise blunt surfaces facing horizontally in the direction of rotation of the plate 50, mounted thereon, as shown in the detail view of FIG. 1a, such that their small ends 72 extend upwardly a short distance from the uppermost surface 74 of the plate. As best seen in FIG. 2, these rivets 70 are spaced over the surface 74 of the plate 50 in a plurality of arcuate radiating rows 76 extending from the center 78 of the plate 50 outwardly toward the peripheral edge 80. For optimum performance, the rivets 70 should be about 3/16 to ¼ inch in diameter and be separated from one another by a spacing of about ¼ to ⅜ inch. Their small ends 72 should protrude above the upper surface 74 of the plate member 50 a distance of approximately ¼ to ⅜ inch and be preferably untreated, that is, left in their original blunt form. Every other row 76 of rivets should have the rivets located at radii which fall between the corresponding radii used in the adjacent rows so that the rotary paths of rivets in adjacent rows are interstitial with respect to one another. Attachment of the plate member 50 to the shaft 62 may be by any suitable means such as flange members 64 attached to both the shaft and the plate.

The filter element 56 surrounding the plate member 50 is preferred throughout at least a portion of its height, as best shown in FIG. 2, by a plurality of small apertures 90, preferably about 1/16 inch in diameter, to create a porous filter medium through which material having a predetermined fluidity or flowability may readily pass. Attachment of the filter element 56 to the plate member 50 is also by any suitable means creating an annular space between the filter element and plate member, such as attachment to a plurality of angled brackets 92 that are in turn attached to the plate member. For reasons explained below, the side walls 94 of the annular filter element 56 are slanted outwardly toward the base 96 of the filter to form the frusto-conical configuration shown in FIG. 1. Finally, the open bottom of the filter element 56 is closed by the bottom member 58 slidably mounted on the shaft 52, by attachment to a sliding collar member 95 or other suitable means, so as to rotate therewith and be movable downwardly thereon. As mentioned earlier, this bottom member 58 is biased in an upward direction toward the base 96 of the filter element 56 by any suitable means such as the plurality of springs 60 shown in FIG. 1 as extending in tension between the bottom member and the upper plate member 50. An annular gasket 98 or other suitable sealing member is fitted about the base 96 of the filter element 56 to provide a sealing interface between the base of the filter and the bottom member 58. A lever 100 or other suitable member hingedly attached at one end 101 to the enclosure 20, coupled to the collar 95 and extending through slot 101 in the enclosure 20 to terminate in a foot pedal 102, facilitates vertical displacement of the bottom member 58 as desired. Note that the peripheral edge 104 of the bottom member 58, seen best in FIG. 1b, extends beyond the base 96 of the filter element to form a portion angled upwardly for reasons discussed below.

Surrounding the peripheral edge 104 of the bottom member 58 and sealingly attached to the enclosure 20 is an annular ledge 110, the bottom 112 of which may be slanted downwardly toward the enclosure as shown in FIG. 1, and the interior edge 114 of which, also seen best in FIG. 1b, is slanted upwardly toward the interior of the enclosure. The uppermost limit of this interior edge 114 should be slightly lower, as shown in FIG. 1b, than the uppermost limit of the edge 104 of the bottom member 58 for reasons discussed below. A fluid conduit 116 connects the ledge 110 to the exterior of the enclosure 20. This conduit may be terminated in any suitable means, not shown, for selectively controlling the flow of a liquid therethrough.

One or more walled pans 130 are mounted within the enclosure 20 proximate its base 132 to form the bottom of the apparatus. These pans should be of a size and shape substantially closing off the open bottom of the enclosure 20 yet permitting their ready removal.

In use, the apparatus is activated by energizing the motor 52 to rotate the filter assembly at an angular speed of about 1720 RPM. Plant material is then introduced into the apparatus by being dumped or dropped through the open top of the hopper 22. As the material strikes the upper surface 74 of the rotating plate member 50, it is pulverized by impact with the blunt, rounded sides of the rapidly whirling rivets 70. After being reduced to a mixture of its pulp and juice components by the action of the rivets 70, the material is thrown outwardly by centrifugal force through an annular slit 140 formed between the lower end 38 of the hopper member 22 and the upper surface 74 of the plate member 50 to impinge upon the upper surface 142 of the surrounding filter element 56. For best results, the height of the hopper member 22 should be adjusted, by operation of the wing nuts 141 forming a part of a spring-biased height adjusting means 36, to produce a slit 140 approximately ¼ to 1 inch in height. Slits having a height greater than about 1 inch tend to produce a mixture that is too coarse for effective juice extraction.

As the pulp and juice mixture impinges upon the filter surface 142, it is forced by the angled walls of the filter element to migrate downwardly toward the base 96 of the element. During its migration, the flowable juice component of the mixture passes under centrifugal force through the apertures 90 perforating the filter wall and is thrown outwardly toward the interior wall surfaces of the surrounding enclosure 20. The juice so extracted is permitted to run down the walls of the enclosure and into the receptacle defined by the annular ledge 110 for conduction to the exterior of the apparatus via the conduit 116. Any juice exiting the filter element 56 near its base 96 will be deflected up and over the interior edge 114 of the ledge 110 by the slightly higher upturned edge 104 of the bottom member 58 as shown in the detail view of FIG. 1b. The continued downward migration of the pulp component over the interior surface of the filter element 56 impedes the pulp from accumulating thereon, maintaining the filter element relatively clear of pulp material and thereby permitting the apparatus to be operated for extended periods of time without the normally required frequent shut-down for cleaning the filter.

After an extended period of operation, the pulp material remaining within the spinning filter assembly 24 will have accumulated to a level where it affects the efficiency of the filter element 56. When that level is reached, the operator need merely depress the foot pedal 102 attached to one end of the lever 100 to lower the bottom member 58. As the bottom member 58 is lowered, it and the filter element continue to rotate and the accumulated pulp material is permitted to flow outwardly from the filter assembly under centrifugal force and be deflected downwardly, as shown in the detail view of FIG. 1c, toward the interior wall surface of the lower portion of the enclosure 20 by the underside of the annular ledge 110 and is upturned interior edge 114. This emptying of the still rotating centrifuge assembly 24 is best accomplished by a rapid depression of the pedal 102 to prevent the pulp material from being deflected above the ledge 110, and also to prevent significant interruption of the juice extraction process. As the pulp material strikes the sides of the enclosure 20, it is deflected further downwardly into the pans 130 extending across the bottom of the enclosure. The size of these pans 130 is such that the centrifuge assembly 24 may be emptied a number of times before it is necessary to remove and empty the pans, such removal and emptying also being accomplished without significant interruption of the apparatus operation.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A centrifugal juice extractor for extracting juice from the plant material such as fruits and vegetables comprising:
   a. a walled enclosure having peripheral sides;
   b. an upright open-bottomed hopper member mounted adjacent the top of said enclosure so as to extend below the uppermost limit of said enclosure sides;
   c. a horizontally oriented pulverizing member rotatably mounted within said enclosure a spaced distance from the open bottom of said hopper member, said pulverizing member being rotatable about an axis extending substantially vertically through said hopper member and including pulverizing means associated therewith for pulverizing, during said rotation, plant material impinging thereon into a mixture of its pulp and juice components and discharging said mixture outwardly from said pulverizing member through said space between said pulverizing member and hopper member under centrifugal force after pulverization;
   d. means for rotating said pulverizing member about said axis;
   e. an open-bottomed annular member attached to and surrounding said pulverizing member so as to be rotatable therewith for receiving said mixture discharged from said pulverizing member, said annular member having means defining apertures therein for impeding the outward flow under centrifugal force of said pulp component of said plant material while permitting said flow of said juice component therethrough;
   f. collecting means within said enclosure for capturing said juice component of said plant material passing through said annular member and for conducting said juice component to the exterior of said enclosure;
   g. a bottom member extending across the open bottom of said annular member, and rotatable therewith, said bottom member being selectively lowerable so as to permit said pulp component of said plant material contained within said annular member to pass under centrifugal force downwardly and outwardly toward the peripheral sides of said enclosure; and
   i. means for selectively lowering said bottom member so as to permit said passage from within said annular member of said pulp component of said plant material.

2. The juice extractor of claim 1 wherein said annular member comprises a generally upright, slanting peripheral wall extending around said pulverizing member, the bottom edge of said wall being spaced a radial distance further from the axis of rotation of said pulverizing member than the top edge of said wall so as to urge said pulp component of said plant material, as it collects against the interior of said wall, by centrifugal force downwardly toward the bottom edge of said wall.

3. The juice extractor of claim 1 wherein said pulverizing member includes a rotatable, substantially horizontal plate having a plurality of protrusions attached to said plate so as to extend upwardly therefrom a predetermined distance, said protrusions having blunt surfaces facing horizontally in the direction of rotation of said plate.

4. The juice extractor of claim 1 further comprising yieldable biasing means for urging said bottom member upwardly against the open bottom of said annular member.

5. The juice extractor of claim 1 further comprising means for preventing said pulp component of said plant material, released from said annular member as said bottom member is lowered, from entering the same space within said enclosure as said juice component.

6. The juice extractor of claim 1 further comprising a plurality of walled pans beneath said bottom member configured so as to receive said pulp component of said plant material as said pulp component is released into said enclosure from said annular member, said pans being removably mounted in said enclosure.

7. The juice extractor of claim 1 further including means for adjusting the operative position of said hopper member relative to said pulverizing member so as to permit adjustment of said spaced distance therebetween.

8. The juice extractor of claim 3 wherein said protrusions extend upwardly from said plate a distance in the range from about ¼ inch to about ⅜ inch.

9. The juice extractor of claim 3 wherein said protrusions are cylindrical in shape with a diameter in the range from about 3/16 inch to about ¼ inch.

10. The juice extractor of claim 3 wherein said protrusions are arranged in a plurality of spaced rows radiating outwardly from the center of said plate toward its periphery, each said row having a plurality of protrusions at different radii from said center, the protrusions of one row being located at radii which fall between the corresponding radii of another row so that the rotary paths of the protrusions of said respective rows are interstitial with respect to one another.

11. The juice extractor for claim 8 wherein said protrusions are spaced from one another in said rows by a distance in the range from about ¼ inch to about ⅜ inch.

* * * * *

UNITED STATES PATENT AND TRADEMARK OFFICE
CERTIFICATE OF CORRECTION

PATENT NO. : 4,034,664
DATED : July 12, 1977
INVENTOR(S) : John R. Hassell

It is certified that error appears in the above-identified patent and that said Letters Patent are hereby corrected as shown below:

ABSTRACT Col. 2, line 17 Change "encourage the plug" to --encourage the pulp--.

Col. 6, line 12 Change "upper" to --inner--.

Signed and Sealed this

Eleventh Day of April 1978

[SEAL]

Attest:

RUTH C. MASON
Attesting Officer

LUTRELLE F. PARKER
Acting Commissioner of Patents and Trademarks